April 4, 1961  M. C. GRAY ET AL  2,977,727
FORCE FEED MECHANISM FOR CUTTING AND GRINDING APPARATUS
Filed May 28, 1959  2 Sheets-Sheet 2
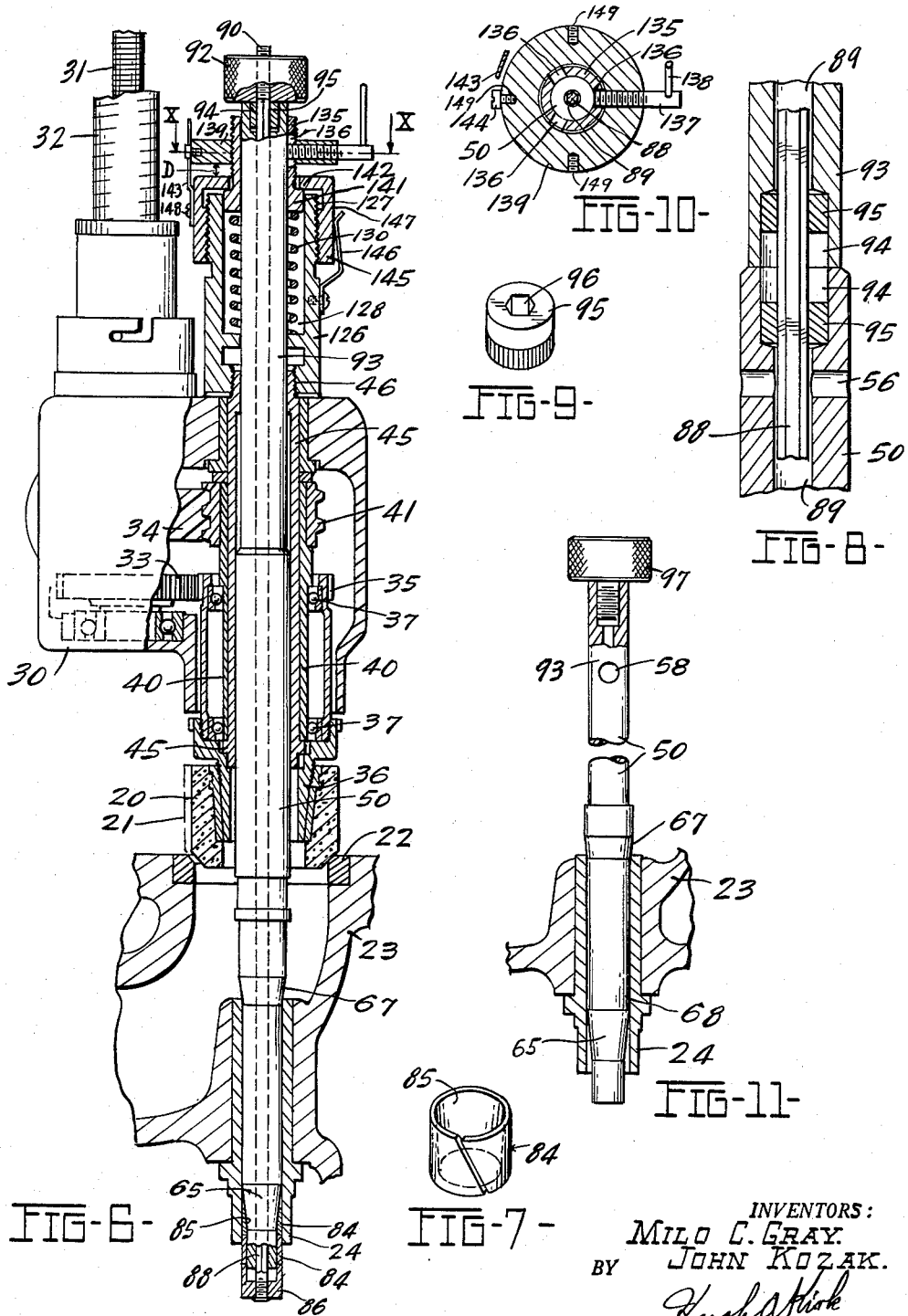
INVENTORS:
MILO C. GRAY.
JOHN KOZAK.
BY Hugh A Kirk
ATT'Y.

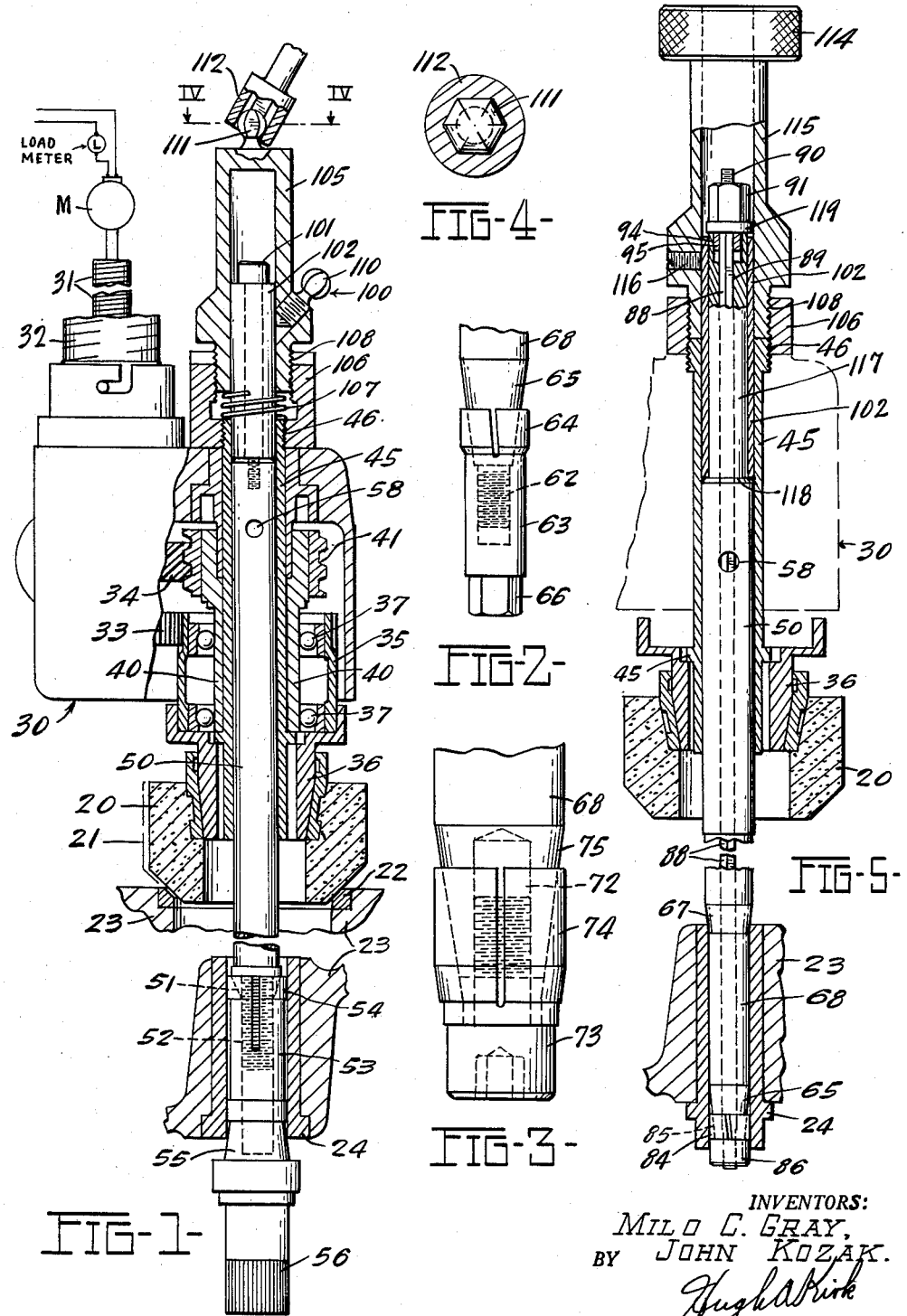

United States Patent Office 2,977,727
Patented Apr. 4, 1961

2,977,727

FORCE FEED MECHANISM FOR CUTTING AND GRINDING APPARATUS

Milo C. Gray and John Kozak, Toledo, Ohio, assignors to Hall-Toledo, Inc., Toledo, Ohio, a corporation of Ohio Filed May 28, 1959, Ser. No. 816,465

22 Claims. (Cl. 51—241)

This invention relates to a mechanism for applying a positive pressure to cutting, abrading or grinding tools. More particularly, it deals with valve-seat types of rotary grinding or cutting tools, such as shown in Beverlin's United States Patent No. 2,338,484, issued January 4, 1944, which are guided in their work by a fixed pilot rod fitted in an existing valve guide axially of the seat to be ground, and from which fixed pilot rod the positive feeding force for the tool is applied.

Previously, the eccentric valve seat grinders of the type disclosed in the above mentioned Beverlin patent were controlled in their operation by the skill of the operator which could be limited by a screw cap which abutted against the end of the pilot. Whether or not the tool had completed its cutting operation was determined by sound and/or by a load meter connected into the circuit to the electric motor driving the grinder. The speed at which such grinding operations took place thus was controlled either by the weight of the tool on the grinder and/or the manual pressure applied to it by its operator.

It is an object of this invention to produce a simple, efficient, effective, economic, accurate and adjustable positive force feed mechanism for rotary valve seat type of grinding, cutting or abrading tools guided in their operation by fixed pilot rods.

Another object is to provide such a force feed mechanism for the type of internal combustion engine valve seat grinders disclosed in the above mentioned Beverlin Patent No. 2,338,484, which mechanism is positive in its operation both for feeding and retracting the grinder to and from the work being ground, and which is also quickly positioned and quickly released, that is, does not require time for turning a long series of threads for positioning, adjustment and releasing the grinder.

Another object is to produce such a force feed mechanism which is readily adaptable to existing grinding and cutting tools and their corresponding pilots.

Another object is to produce such a force feed mechanism for a tool and its pilot in which the mechanism and the pilot may be mounted on and carried with the tool as a unit.

Another object is to produce an adjustable force feed mechanism for automatically feeding and controlling the depth of feed of a grinding or cutting tool.

Generally speaking, the force feed mechanism of this invention operates between a rotary grinding or cutting tool for machining a circular piece of work, such as a valve seat, and a fixed axially located pilot for such a tool which pilot may be carried by the tool or independently positioned adjacent the work piece, such as in an existing valve guide for a valve to be ground in an internal combustion engine. This pilot may extend through a guiding hole or sleeve in the center of the rotating grinding or cutting tool, so that after the pilot is fixed with respect to the work piece, the tool is positioned by axially sliding over and along the pilot until the abrading or cutting surface or edge of the tool is in engagement with the piece to be worked upon. The force feed mechanism of this invention includes means, such as a set screw, for then clamping the housing or support for the tool to the fixed pilot to restrict the tool's further axial sliding movement. Then by means of inter-threaded sleeves around the pilot connected between the clamping means and the housing for the tool, the accurate and positive adjustment and/or feeding of the tool to and from the work piece is accomplished. These inter-threaded sleeves may be operated either manually by a knurled knob or by a wrench, and one of which sleeves may include a set screw and comprise a cap which fits over the end of the pilot and screws into another or cooperating sleeve or bushing attached to the housing for the tool. These inter-threaded sleeves also may include adjustable stop means and resilient means, such as a spring, for automatically feeding the tool between pre-set stops or limits provided between the sleeves. Thus a positive and limited automatic forced feeding mechanism is provided, which in combination with a load meter on the motor driving the tool, enables one operator to simultaneously operate a plurality of tools.

The above mentioned and other features and objects of this invention and the manner of attaining them will become more apparent and the invention itself will be understood best by reference to the following description of several embodiments of the invention taken in conjunction with the accompanying drawings, wherein:

Fig. 1 is a vertical section of one embodiment of the force feed mechanism of this invention adaptable to a grinding head for grinding the valve seat of an internal combustion engine and guided on a separate stationary pilot insertable through the bottom of the valve guide for that valve seat and manually wedged therein, which force feed mechanism comprises a wrench turnable cap sleeve engageable with a rotating sleeve mounted on the outer upper end of the pilot, which cap sleeve threads into a bushing mounted onto the housing of the grinding head for the tool;

Fig. 2 discloses the lower end of a pilot similar to that in Fig. 1 showing another type means for wedging the lower end of a pilot in a valve guide;

Fig. 3 is an enlarged lower end of a pilot similar to that in Fig. 1, showing still another type of means for wedging the lower end of a pilot in a valve guide;

Fig. 4 is an enlarged transverse section taken along line IV—IV of Fig. 1 showing the hexagonal type nut and cooperating socket wrench for adjusting and operating the force feed mechanism;

Fig. 5 is a vertical section, similar to that in Fig. 1, of another embodiment of this invention showing a manually operated force feed mechanism on a different type of a pilot, namely a pilot anchorable in a valve guide from upper end of the guide, which pilot is wedged in the valve guide by a split collet operated by turning a nut on the upper end of the pilot to pull up on a rod extending through the hollow center of the pilot to the collet at the lower end thereof;

Fig. 6 is a vertical section of still another embodiment of this invention showing an automatic force feed mechanism including means for adjusting and limiting the amount of the feed and mounted on a pilot carried by the grinding tool and similar to that shown in Fig. 5;

Fig. 7 is an enlarged perspective view of the split collet employed at the lower end of the pilots shown in Figs. 2, 5 and 6;

Fig. 8 is an enlarged vertical section of the center portion of a pilot similar to that shown in Fig. 6, but made of two pieces, namely, how a shorter and standard pilot may be provided with an extension for adaption of the force feed mechanism of this invention;

Fig. 9 is a perspective view of one of the inserts placed in each of the two connected pilot members shown in Fig. 8, for preventing the rotation of the hexagonal rod axially movable through the center of the pilot;

Fig. 10 is a transverse section taken along line X—X of Fig. 6 showing the means for clamping the force feed mechanism to the pilot and stop means for pre-setting and controlling the depth of the cut of the tool; and Fig. 11 discloses a partial view of a plug type pilot which may be employed instead of the pilot disclosed in Fig. 6.

Before describing the details of the force feed mechanism of this invention, the particular example of the tool chosen for illustration thereof, namely, a valve seat grinder, will first be described as well as the different types of pilots which may be used therewith for guiding this grinder, which pilots also may be adapted for use with the force feed mechanism of this invention.

I. *The abrading, grinding or cutting tool*

Referring generally to Figs. 1, 5 and 6 there is shown partly in vertical section a housing of an eccentric valve seat grinder similar to that shown in the above mentioned Beverlin patent, which comprises a rapidly rotating bevelled annular shaped grinding or cutting stone 20, which also and more slowly gyrates eccentrically from its full line position 20 to its dotted line position 21 shown in Figs. 1 and 6, so as to cut only one place at a time around the valve seat insert 22 in the head or block 23 of an internal combustion engine, which block also includes a hollow tubular valve guide 24 axially spaced and concentric with the axis of the circular valve seat insert 22.

In the specific example disclosed both the faster rotation and slower gyration of the cutting or grinding tool 20, is produced in a single gear housing 30 of the grinding head to which may be connected a flexible rotating shaft 31 in a sheath 32 extending from a rotating power source, such as an electric motor M, which shaft 31 may drive both a spur gear 33 and a worm gear 34 journalled in the housing 30. The spur gear 33 rotates the grinding tool 20 through its intermeshing deep teeth with a gyrating gear sleeve 35, to the outer projecting lower end 36 of which an annular cutting tool or stone 20 may be releasably attached for replacement, such as after wear or for different contoured working surfaces. This fast rotating and gyrating sleeve gear assembly 35 and 36 may be journalled in a pair of ball bearings 37 on an eccentric driven sleeve 40, keyed to a worm gear 41, driven by the worm 34. This slower worm drive of the eccentric sleeve 40 causes the gyratory movement of the grinding tool 20. Through the center of the eccentric sleeve 40 is a tubular guide sleeve 45 which may be stationary and anchored to the housing 30, and through which guide sleeve 45 the guiding section 50 of a stationary pilot extends and accurately fits for steadying the grinding head during its rotating and gyrating movements. It is to the upper end of this fixed guide sleeve that the force feed mechanism described later may be attached through external screw threads 46 on said sleeve 45.

Although the specific example of the grinding and cutting tool disclosed in the figures both rotates and gyrates eccentrically, the force feed mechanism of this invention also may be applied to grinders which only rotate and do not gyrate.

II. *The pilot guides for the tool*

In the various figures of the drawings there are several different types of pilots or guides for the internal combustion engine valve seat grinding tool disclosed, which pilots may be made solid or hollow or made of one piece or have extensions attached thereto for the force feed mechanism. Also these pilots may be machined for direct wedging into a valve guide 24 or may have manually or wrench screw operated expanding collets, insertable from either end of the valve guide, depending upon the type of engine and the accessibility of its valve seats and guides, such as when the engine is in production or during its manufacture, or when it is already assembled and being overhauled. It is to be understood, however, that any of the different features of the different types of pilots and their wedging means shown in the drawings, may be interchanged without departing from the scope of this invention.

The tool guiding section of all of the different pilots disclosed, namely that section which intimately fits inside of the hollow guide sleeve 45 in the tool housing 30, will be referred to as guiding section 50, although each section 50 shown in the different figures have different types of end sections. One or the upper end sections of each pilot is adapted for cooperation with the force feed mechanism of this invention, and the lower or other end section is adapted for stationary or rigidly releasable insertion and alignment into the valve guides 24. Since different internal combustion engines have different types and shapes and sizes of valves and valve guides, a correspondingly different number of valve guide engaging sections on the pilots must be employed, which also may include several different types of engaging mechanisms, namely from that of a plain tapered wedge or plug type as shown in Fig. 11, to that of different types and means for operating expanding collets, as shown in Figs. 1, 2, 3, 5 and 6.

In Fig. 1 the valve guide insert section of the pilot 50 is shown to have a tapered or frusto-conical portion 51 connecting a threaded portion 52 over which an internally threaded split sleeve 53 is fitted having an outer complementing tapered or internal frusto-conical collet portion 54 and a larger external frusto-conical wedging portion 55 connected to a knurled manually operated shank 56. This pilot is positioned by insertion of the pilot section 50 up through the bottom of the valve guide 24 until the external tapered or frusto-conical wedging portion 55 wedges against the lower edge of the valve guide insert 24, and then by rotation the shank 56 while holding the guiding section 50 from rotating by means of a pin or wrench which may be inserted through the diametrically transverse hole 58, the split end and collet portion 54 is wedged outwardly by the conical section 51 to expand against the upper internal wall of the valve guide ring 24 thus stationarily anchoring the pilot axially of the valve seat 22 and extending upwardly through the center of said seat for support of the cutting tool head 30, which then is axially slid over the section 50 of the pilot.

If there is not sufficient room for the manual knurled shank 56 shown in Fig. 1 below the valve guide, a smaller socket 63 as shown in Fig. 2 may be provided instead of the socket 53, 55 and 56, which socket 63 may be attached to a further lower reduced diameter and threaded end 62 of the pilot inserted through the top of the valve guide and having a second reduced tapered portion 65 over which a separate split collet ring 64 may be wedged by rotating the socket 63 by a wrench engaging the nut 66 thereon to spread the collet 64 against the lower inside of a valve guide 24, while the upper end of the valve guide engaging section of the pilot may be wedged by a tapered or frusto-conical portion 67, as shown on the similar section of the plug pilot in Fig. 11, against the upper inner edge of the valve guide insert 24. Thus, a cylindrical portion 68 is provided between the frusto-conical portions 65 and 67, which portion 68 closely fits into the central cylindrical portion of the valve guide 24. Similarly, instead of an externally threaded shank 62, the lower tapered end 65 may be replaced, as shown in Fig. 3, if of sufficient diameter, with an internally threaded socket 72 in a tapered or frusto-conical section 75, into which socket 72 a socket headed bolt 73 may be threaded for expanding a split collet 74 over the tapered section 75.

In the event the lower or inner end of the valve guide 24 is inaccessible even to a wrench, an expandable collet may be employed on a pilot of the type shown in Figs. 5 and 6, in which a split collet ring 84 (see also Fig. 7), having a tapered or frusto-conical inner surface 85 which cooperates with the external frusto-conical lower end portion 65, is expanded by axial upward movement by means of the cap 86 over the lower end of the pilot. This cap 86 may be attached to the lower end of a hexagonal rod 88 which extends through an aperture 89 longitudinally and axially through the center of the entire pilot including its section 50, and out and beyond the upper end of the pilot. This upper end 90 of the rod 88 is threaded so that a hexagonal nut 91 (see Fig. 5) or a knurled nut 92 (see Fig. 6) may be tightened thereon to draw up the rod 88 and its cap 86 for expanding the collet 84 on the tapered portion 65, thereby stationarily anchoring the pilot in position in the valve guide 24.

Referring to Fig. 8, the one piece pilot shown in Figs. 5 and 6 may be replaced by a standard and shorter type of pilot 50 to the upper end of which section 50 there is connected a separate section or extension 93. In each separate section 50 and 93 there is a socket 94 into each of which an externally roughened or knurled hexagonal-holed ring 95 (see Fig. 9) is force fit. The rod 88 axially fits and slides through the hexagonal hole 96 through the ring 95, but the rod 88 is prevented from rotation with respect to the sections 50 and 93 thereby so that the collet 84 may be readily drawn up when the nut 91 or 92 is turned. Similarly, a ring 95 may be placed in sockets 94 in the upper ends of the one piece pilot rods shown in Figs. 5 and 6 for preventing rotation of their hexagonal rods 88.

If desired, a plug type pilot as shown in Fig. 11 may be used without the collet 84 and its operating mechanisms, by merely wedging the frusto-conical portion 67 into the inner upper edge of the valve guide sleeve 24, and since the portion 68 intimately fits the inside diameter of the valve guide 24, the plug pilot of Fig. 11 is stationarily anchored into position. For release of such a plug type or other type of pilot, it has been found that a slight quick twisting action of the pilot, such as by a tool inserted in aperture 58, will cause ready release of the flow type wedging connection between the upper rim of the valve guide 24 and the tapered portion 67 without damage to the valve guide 24. However, such a twist release engaging hole 58 is not required in the particular type of pilot shown in Fig. 6 which is carried by the grinding tool, in that the long set-screw connection 137 of the force feed mechanism may be used for effecting the twist release action for the pilot. Furthermore, the knurled nut 92 shown in Fig. 6 may be replaced by a cap screw or bolt 97 on the plug type pilot of Fig. 11 when such pilot is to be carried with the grinding tool as the pilot is in the embodiment shown in Fig. 6.

III. The force feed mechanism

Referring now to the embodiment of the force feed mechanism 100 disclosed in Fig. 1, there is shown screwed to the upper end of the pilot section 50 a shoulder bolt 101, around which freely rotates a sleeve 102. Over this sleeve 102 there is slid a cup-shaped sleeve 105 which is threaded into a socket sleeve 106, which may be screwed to the threads 46 at the upper end of the guide sleeve 45, or otherwise attached to the housing 30. Between the housing 30 or the upper end of the guide sleeve 45, there may be employed a spring 107 to take up any slack in the threads 108 between the cap sleeve 105 and socket section 106.

In setting up the grinder after the pilot has been fixed in the valve guide, the housing 30 together with the tool 20 and force feed mechanism 100 is quickly slid over the top of the pilot 50 and in its extension sleeve 102 until the bevelled edge of the grinding stone 20 contacts the valve seat 22. Then the set screw 110 in the side of the cap sleeve 105 is screwed into engagement with the freely rotating sleeve 102 on the upper end of the pilot, to lock the grinding head 30 from longitudinal or axial movement with respect to the seat 22 to be ground. In order to start the electric motor for driving the grinder, the cap sleeve 105 may be rotated clockwise a fraction of a turn to raise the tool from the valve seat 22 so that no friction between the tool 20 and seat occurs to stall the motor. Then after the motor is started and the tool 20 is rotating, the sleeve 105 is rotated gradually in a counter-clockwise direction to feed the tool down toward the seat 22 until the valve has been completely ground, such as by means of the hexagonal ball type head 111 at its upper end through a cooperating hexagonal socket wrench 112 (see also Fig. 4).

A load meter L (see Fig. 1) may be connected in series with the motor M driving the tool through the flexible shaft 31, so that as soon as the cutting friction or load on the tool 20 is decreased, it can be detected, indicating that the cutter 20 either needs to be fed more by turning the cap sleeve 105, and/or that the operation is completed. Thus a definite positive force may be applied to the cutting tool 20 against the work or seat 22 to materially increase the speed of cutting, which may be regulated according to the load, that is by turning the sleeve 105 to keep a constant load on the motor. After the grinding operation has been completed, rather than unscrewing the whole mechanism along the threads 108, the set screw 110, which may be adapted with a hexagonal ball head similar to ball head 111, may be fitted with wrench 112 and released, so the whole mechanism 30 may be quickly slide off the end of the pilot. Then the pilot may be released by unscrewing the shank 56 on the other side of the valve guide and the grinder and pilot are now ready for set-up in the next valve to be ground.

Instead of the socket wrench 112 and ball head 111 as shown in Fig. 1, there may be provided a knurled knob 114 for manually operating a cap sleeve 115 in Fig. 5, having a standard slotted end type set screw 116 therein for engagement with the rotating sleeve 102. Also instead of being able to employ the shoulder bolt 101 as shown in Fig. 1, the upper extension portion of the pilot 50 may have a reduced diameter 117 on which the rotating sleeve 102 is journalled and limited in axial movement by shoulder 118 and washer 119 which washer is held in place by the nut 91 on the rod 88.

Referring now to the automatic force feed mechanism disclosed in Fig. 6, the threads 46 on upper end of the guide sleeve 45 fixed to the housing 30 are screwed to an elongated socket sleeve 126 externally threaded at its upper end 127 and provided with a central annular chamber 128 in which may be located a compression helical spring 130 which reacts between the lower end of the chamber 128, or the housing 30, and a pilot anchored sleeve 135 which may be clamped along the extension 93 on the pilot 50. This anchored sleeve 135 may be provided with one or more radially located elongated slots or apertures 136 so their location may readily be determined for alignment with the set screw 137 having a manual lever 138 and radially extending from a cutting depth limiting ring nut 139 threaded exteriorally of the sleeve 135 as well as to permit axial adjustment of said nut 139 along the sleeve 135 and still provide an aperture 136 for the set screw 137. Thus, by unscrewing the set screw 137 out beyond the outer diameter of the sleeve 135, the ring nut 139 may be rotated to different axial positions along the sleeve 135, and then when the nut 137 is aligned in one of the apertures 136 it may be screwed into position to clamp the fixed extension 93 of the pilot and thus limit the upward motion of the cutting tool assembly 30.

The lower end of the pilot anchored sleeve 135 is provided with an outwardly extending flange or shoulder 141 which engages a corresponding flange 142 on adjustable internally threaded cap sleeve 145 which cooperates with the threads 127 on the socket sleeve 126. Thus, when the cap sleeve 145 is unscrewed so that its upper surface abuts against the ring 139, the clearance between the abutting shoulders 141 and 142 (which then is equal to D) is the distance which the mechanism or cutting head 30 may travel with respect to the fixed pilot 50, and corresponds directly with the depth of the cut which can be made into the work or valve seat 22 by the cutting or grinding tool 20. Thus by pre-setting the distance D of the ring 139 from the shoulder 141, less the thickness of the flange 142, the depth of the cut or grind may be predetermined.

In this embodiment of Fig. 6, the pilot 50 is carried with the tool head 30 in the sleeve 45 and is prevented from sliding out of the sleeve 45 by the head nut 92. Thus in setting up this embodiment to grind a valve seat, after the shank 68 at the lower end of the pilot is inserted in the valve guide 24, the nut 92 is tightened to draw up the collet 84 to anchor the pilot in position. Then, the tool head 30 is lowered along the pilot section 50 until the grinding stone 20 contacts the valve seat 22, at which point the set screw 137 is clamped through an aligned slot 136 to axially anchor the sleeve 135 to the stationary pilot. Before the rotation of the grinder can be started, the stone 20 must be raised slightly from the seat 22, which is done by giving a fraction of a turn to the cap nut 145 to compress the spring 130 and raise the assembly 30 on the now fixed shoulder 141 of the anchored sleeve 135. After the grinder is started, the cap sleeve 145 is then backed off until its top contacts the bottom of the fixed ring 139, or that part of a turn which may be limited by the contact of the finger 143 (fastened to cap sleeve 145) with the set screw 137, or with a pre-set one of the peripheral stops or screws 144 projecting from one of a plurality of tapped holes 149 in the periphery of the ring nut 139. Thus the holes 149 shown at 90° intervals in Fig. 10, permit the amount of feed of the grinder and its stone 20 to be pre-set to ¼, ½, ¾ or 1 full turn of the cap sleeve 145 in accordance with the pitch of the threads 127 between the cap sleeve 145 and the socket sleeve 126. Various spacing of the stops 144, and various pitches of the threads 127 may thus be used without departing from the pre-set adjustment features of this automatic force feed mechanism. In order to insure the setting of the cap nut 145, there may be provided a friction leaf spring 146 attached to the socket sleeve 126, which leaf spring engages the knurled or roughened outer surface 147 of the nut 145 to prevent the vibrations of the tool from changing the pre-set adjustment of the cap sleeve 145 for the depth of the cut.

Since the spring 130 normally tends to maintain the flanges 141 and 142 in contact as shown in Fig. 6, once the cap sleeve 145 is unscrewed so that its finger 143 abuts a stop 144, set-screw 137, or ring nut 139, to produce a predetermined gap between the flanges 141 and 142, the spring 130 will automatically feed the grinder and its stone 20 downwardly until this gap is closed and the flanges 141 and 142 are in contact again. This contact of the flanges 141 and 142 may be indicated by the lack of load on the motor M determined by load meter L as shown and described with the embodiment of Fig. 1.

If desired, the force feed mechanism shown in Fig. 6 may be manually instead of automatically operated by abutting the top of the cap sleeve 145 against the bottom of the ring nut 139 when the stone 20 just starts to cut the seat 22, and then manually unscrewing the cap sleeve 145 against the fixed ring nut 139 to force the grinder assembly 30 downwardly as long as the screw threads 127 of the sleeves 145 and 126 remain in mesh. In this situation, or when more than one rotation of the cap sleeve 145 is required to complete the desired cutting operation, the leaf finger 143 should be removed or turned tangentially of the cap sleeve by loosening its holding screw 148, so the finger 143 will not hit either the stop 144 or the set-screw 137.

While there is described above the principles of this invention in connection with specific apparatus, it is to be clearly understood that this description is made only by way of example and not as a limitation to the scope of this invention.

What is claimed is:

1. A force speed mechanism for a circular valve seat type of rotating grinding or cutting tool, in which said valve seat has a longitudinal valve guide axial of said seat, said mechanism comprising: a pilot located in said longitudinal guide and having structural means for removably anchoring said pilot at at least two axially spaced points in said guide, a means axially slidable over said pilot to and from said seat, means for removably anchoring said slidable means to said pilot, and means for connecting said slidable means to said tool for positively axially moving said tool to and from said seat with respect to said anchored slidable means.

2. A mechanism according to claim 1 wherein said slidable and said connecting means each comprise a sleeve, and means for rotating said sleeves with respect to each other.

3. A mechanism according to claim 2 including adjustable means for limiting the relative movement between said sleeves.

4. A mechanism according to claim 3 wherein said connecting means comprises a pair of cooperating sleeves with abutting shoulders, and resilient tool feeding means for normally urging said shoulders into abutment with each other.

5. A mechanism according to claim 1 wherein said anchoring means between said slidable means and said pilot comprises a set screw means.

6. A mechanism according to claim 1 wherein said anchoring means between said slidable means and said pilot comprises a rotating sleeve mounted on said pilot and a set screw in said slidable means engageable with said rotating sleeve.

7. A mechanism according to claim 1 wherein said connecting means comprises screw threads between it and said slidable means.

8. A force feed device for a tool for cutting or grinding circular valve seats having valve guides, comprising: a rotating cutting or abrading tool having an axial hole therethrough, means to rotate said tool, a pilot rod for said tool extending through said hole, means to stationarily fix said rod axially of the circular valve seat to be ground in said valve guide at least near both ends of said guide, a sleeve means in said hole of said tool to mount said cutting and abrading tool on and around said rod, means to clamp said sleeve means to said rod to prevent its axial movement along said rod, and means for axially positively moving said tool on said sleeve means to and from said seat to be cut or ground.

9. A tool according to claim 8 wherein said means to fix said rod comprises a wedged plug connection into at least near one end of said valve guide for said valve seat being cut or ground.

10. A tool according to claim 8 wherein said means to fix said rod comprises a split collet over a tapered portion of said rod and screw threaded means to wedge said collet into engagement with the inner walls near one end of said valve guide.

11. A force feed device for a rotating cutting tool for a circular work piece, a pilot rod for said tool, means for stationarily mounting said pilot rod concentrically of said work piece, a rotatable sleeve means mounted on said pilot rod a housing for said tool, means in said housing for rotating said tool, slidable sleeve means for mounting said housing on and around said rotatable sleeve means on said pilot, means for clamping said slidable sleeve means to said rotatable sleeve means along said pilot rod, and means for axially and positively moving said housing relatively to said clamped sleeve means for moving said cutting tool to and from the work piece to be cut.

12. A tool according to claim 11 wherein said means in said housing for rotating said tool comprises an eccentric sleeve means for rotating and simultaneously gyrating said tool about the axis of said circular work piece.

13. A tool according to claim 11 wherein said moving means comprises a screw thread connection.

14. A tool according to claim 11 wherein said slidable sleeve means comprises a screw cap over the end of said pilot rod.

15. A tool according to claim 14 wherein said clamping means comprises a set screw mounted in said cap.

16. In a machine having a cutting wheel rotatable about a hollow shaft, a fixed pilot mounted coaxial with the piece of work to be cut and extending through said hollow shaft, and a housing for journalling said shaft, the improvement comprising: a sleeve connected to said housing and axially slidable along said pilot, means for clamping said sleeve at any desired location along said pilot, threaded means between said sleeve and said housing for effective positive axial adjustment of said housing and its cutting wheel to and from said piece, and adjustable stop means connected to said sleeve for limiting the relative movement between said sleeve and said housing for limiting the feed of said cutting wheel into said piece.

17. A machine according to claim 16 wherein said clamping means comprises a set screw mounted in said sleeve for engagement with said pilot.

18. A machine according to claim 16 including resilient means between said sleeve and said housing for automatically feeding said tool toward said piece between said limits of movement set by said adjustable stop means.

19. In a machine having a cutting wheel rotatable about a hollow shaft, a fixed pilot mounted coaxially with the piece of work to be cut and extending through said hollow shaft, and a housing for journalling said shaft, the improvement comprising: a pair of telescopic sleeve means axially slidable along said pilot, means for connecting one of said pair to said housing and means for clamping the other of said pair at any desired position along said pilot, threaded means between said one of said sleeves and said housing for effective positive axial movement of said housing and its cutting wheel to and from said piece, cooperating flanges on said sleeves for limiting their relative axial movement, and threaded means on said other of said sleeves for controlling said relative movement between said sleeves.

20. A device according to claim 19 including adjustable stop means connected to at least one of said sleeves for limiting said relative movement between said sleeves.

21. A machine according to claim 19 wherein said clamping means comprises a set screw mounted in said other of said sleeves for direct engagement with said pilot.

22. A machine according to claim 19 including resilient means between said other of said sleeves and said housing for feeding said cutting wheel toward said work piece within the limits set by said threaded means on said other of said sleeves.

References Cited in the file of this patent

UNITED STATES PATENTS

| 1,981,269 | Holland | Nov. 20, 1934 |
| 2,338,484 | Beverlin | Jan. 4, 1944 |
| 2,466,359 | Beverlin | Apr. 5, 1949 |